United States Patent
Lin et al.

(10) Patent No.: US 8,467,338 B2
(45) Date of Patent: Jun. 18, 2013

(54) SCHEDULING WIRELESS COMMUNICATION

(75) Inventors: Bo Lin, Glasgow (GB); Wim J. Rouwet, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 460 days.

(21) Appl. No.: 12/374,177

(22) PCT Filed: Jul. 18, 2006

(86) PCT No.: PCT/EP2006/007054
§ 371 (c)(1),
(2), (4) Date: Nov. 10, 2009

(87) PCT Pub. No.: WO2008/009300
PCT Pub. Date: Jan. 24, 2008

(65) Prior Publication Data
US 2010/0046444 A1    Feb. 25, 2010

(51) Int. Cl.
*H04W 4/00* (2009.01)
*H04L 1/00* (2006.01)
*H04L 12/26* (2006.01)
*H04L 12/28* (2006.01)
*H04L 12/56* (2006.01)
*H04J 3/02* (2006.01)
*H04J 3/16* (2006.01)

(52) U.S. Cl.
USPC ...... 370/329; 370/235; 370/395.41; 370/462; 370/468

(58) Field of Classification Search
USPC ................ 370/235, 236, 237, 329, 395.41, 370/462, 468
See application file for complete search history.

(56) References Cited

U.S. PATENT DOCUMENTS

| | | | | |
|---|---|---|---|---|
| 5,463,620 A | * | 10/1995 | Sriram | 370/412 |
| 6,115,372 A | * | 9/2000 | Dinha | 370/352 |
| 2003/0043823 A1 | | 3/2003 | Klotsche | |
| 2003/0185155 A1 | * | 10/2003 | Huang et al. | 370/235 |
| 2005/0232154 A1 | * | 10/2005 | Bang et al. | 370/235 |
| 2007/0019599 A1 | * | 1/2007 | Park et al. | 370/338 |
| 2007/0234385 A1 | * | 10/2007 | Bopardikar et al. | 725/38 |

OTHER PUBLICATIONS

Hawa; "Quality of service scheduling in cable and broadband wireless access systems" IEEE Tenth International Workshop on Quality of Service, 2002. May 15-17, 2002 pp. 247-255.
K. Wongthavarawat, and A. Ganz, "Packet Scheduling for QoS Support in IEEE 802.16 Broadband Wireless Access Systems" International Workshop on Quality of Service, p. 247-255, 2002 [7].

(Continued)

*Primary Examiner* — Ronald Abelson

(57) ABSTRACT

A method of scheduling wireless communication for one or more data flows, wherein, for each data flow, there is: a corresponding queue to store data of that data flow; one or more quality-of-service parameters associated with that data flow; and a flow type associated with that data flow, there being a plurality of possible flow types; wherein the method comprises, during each time frame of a sequence of time frames, the steps of: maintaining, for each of the plurality of possible flow types, a queue list that identifies the queues corresponding to data flows of that flow type; and processing the queue lists in a predetermined order, in which processing a queue list comprises, for each queue identified in that queue list, attempting to schedule the communication of data stored on that queue during a current time frame in dependence upon the one or more quality-of-service parameters associated with the corresponding data flow and an amount of bandwidth available for the wireless communication during the current time frame.

20 Claims, 6 Drawing Sheets

OTHER PUBLICATIONS

IEEE Standard 802.16(k).

Chen; "A Service Management Strategy for IEEE 802.16 Broadband Access Systems in TDD Mode"; IEEE Int'l Comm. Conference 2005, p. 3422-3426.

Ryong; "Downlink Packet Scheduling Based on Channel Condition for Multimedia Services of Mobile Users in OFDMA-TDD"; 6th Pacific-Rim Conference on Multimedia, 2005, vol. 3768, p. 224-234.

* cited by examiner

US 8,467,338 B2

SCHEDULING WIRELESS COMMUNICATION

FIELD OF THE INVENTION

This invention relates to a method of scheduling wireless communication of data. This invention also relates to an apparatus arranged to carry out the scheduling method and to a computer program which carries out the scheduling method.

BACKGROUND OF THE INVENTION

There is currently a drive to develop wireless communication technologies to handle so-called "first-mile/last-mile" data communication, i.e. being able to transfer data between a widespread wired communication infrastructure/network and particular senders/recipients who are geographically near to, but not physically connected to, that infrastructure. Examples of such developing technologies include technologies that conform to the IEEE802.16 standards, also known as WiMAX.

Typically, in such communication scenarios, a base station forms part of the wired communication infrastructure/network and is responsible for wirelessly communicating data to one or more intended recipients and wirelessly receiving data from one or more senders. The base station therefore uses a scheduler to determine which data, and how much data, should be wirelessly communicated to the intended recipients, and when.

Current scheduling methods assume that there is a fixed bandwidth available for the data communication. However, the bandwidth available for wireless communication varies over time depending on several factors, such as the weather, the geographical and environmental location of the recipient and the base station, etc. Each of these has an impact on the choice of modulation method used for the wireless communication. Therefore, there is a need for a scheduler that can efficiently use the dynamically changing bandwidth that is actually available for the wireless communication.

Additionally, different data flows that are communicated may have different associated quality-of-service requirements, and, due to the nature of wireless data communication, these may vary over time. There is therefore the additional need for a scheduler that can perform communication scheduling whilst taking account of the various dynamic quality-of-service requirements for the data to be communicated.

There is also the need for a scheduler that can be easily maintained and that can easily cope with the introduction of new types of data flow and quality-of-service requirements, without a significant impact on the operation of the scheduler.

SUMMARY OF THE INVENTION

According to a first aspect of the invention, there is provided a method according to claim 1.

According to a second aspect of the invention, there is provided an apparatus according to claim 32.

According to a third aspect of the invention, there is provided a wireless communication system according to claim 33.

According to a fourth aspect of the invention, there is provided a computer program according to claim 34.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1:
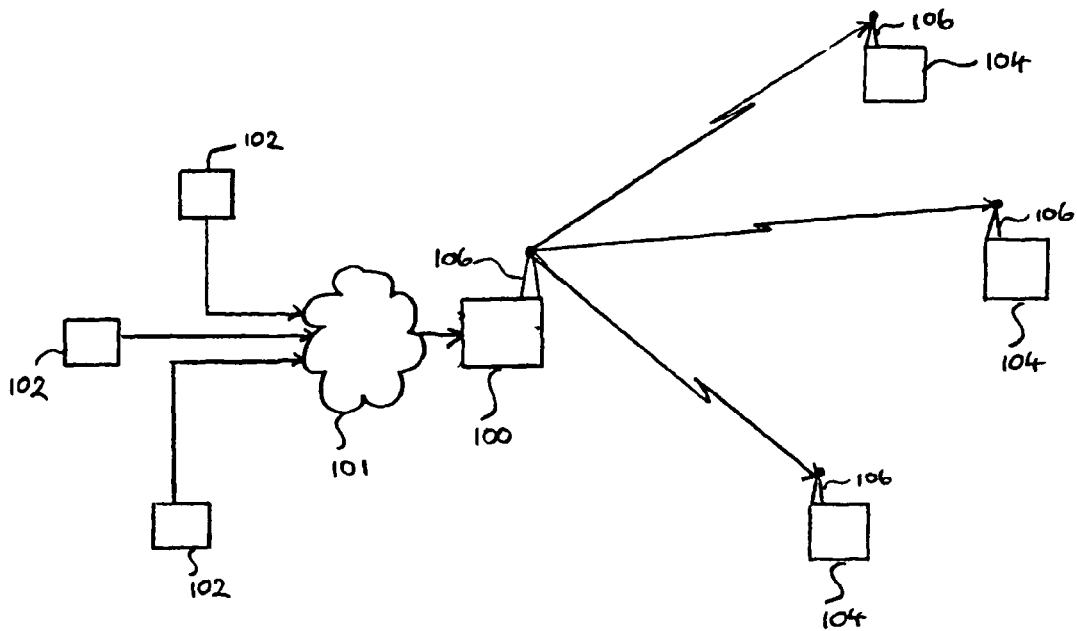
FIG. 1 schematically illustrates an overview of a communication system according to an embodiment of the invention.

FIG. 1 schematically illustrates an overview of a communication system according to an embodiment of the invention. A base station 100 receives data from one or more data sources 102, for example, via the Internet 101. The communication of data from a data source 102 to the base station 100 is over a cable/wire. The data received by the base station 100 from a data source 102 is intended to be delivered to a subscriber station 104. The base station 100 therefore communicates data that it has received and that is addressed to a particular subscriber station 104 to that subscriber station 104. This is performed by wireless communication, the base station 100 and the subscriber stations 104 having appropriate antennae 106 for this wireless communication.

A data source 102 may supply a continual stream of data to the base station 100. Alternatively, a data source 102 may supply data to the base station 100 on a more intermittent/sporadic basis. The term "data flow" shall therefore be used to cover all such flows of data from a data source 102 to the base station 100 and on to a subscriber station 104. More details and examples of data flows are given later.

Examples of data sources 102 include service provider servers, any computer connected to the Internet 101, etc., and it will be appreciated that the communication of a data flow from a data source 102 to the base station 100 may be via one or more intermediaries, such as routers, gateway computers, etc. Examples of subscriber stations 104 include: personal computers, portable or mobile telephones, personal digital assistants (PDAs), wireless video or multimedia devices, etc.

The communication of a data flow from a data source 102 to the base station 100 may be by any appropriate communication technique/protocol supported by the base station 100 and that data source 102. For example, the base station 100 may have an Ethernet card (not shown) that it uses to communicate with the data sources over the Internet 101. The wireless communication of a data flow from the base station 100 to a subscriber station 104 may be by any appropriate coding/modulation technique/protocol supported by the base station 100 and that subscriber station 104.

It will be appreciated that the antenna 106 of the base station 100 or a subscriber station 104 may be integral to the base station 100 or the subscriber station 104 or may be a separate unit used by the base station 100 or the subscriber station 104.

Figure 2:
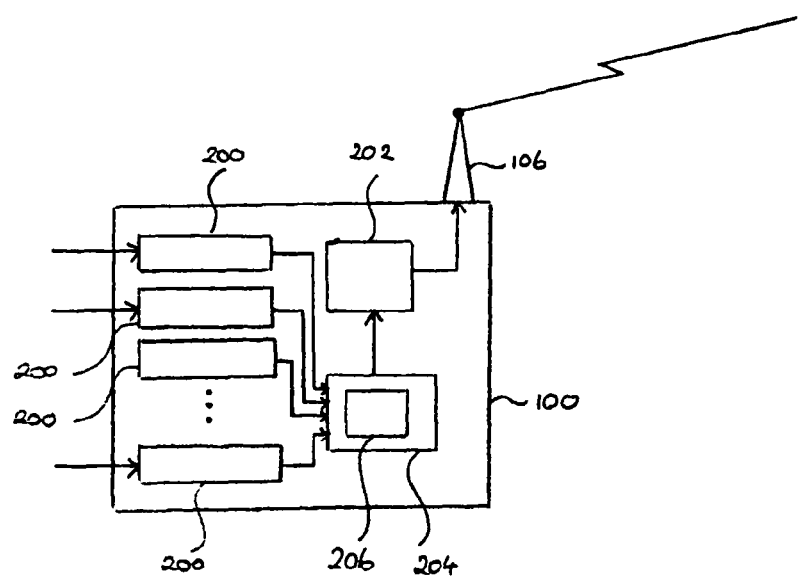
FIG. 2 schematically illustrates a base station shown in FIG. 1, according to an embodiment of the invention.

FIG. 2 schematically illustrates the base station 100 shown in FIG. 1. The base station 100 has a plurality of queues 200. The data of a data flow received by the base station 100 from a data source 102 is stored in a corresponding queue 200. As shown in FIG. 2, the base station 100 is currently receiving three data flows and is storing the data of each of the data flows in a corresponding queue 200. As the base station 100 shown in FIG. 2 has more than three queues 200, one of the queues 200 is not currently receiving and storing data of a data flow.

The base station 100 also has a controller 204 which controls the operation of the base station 100. To this end, the controller 204 includes a scheduler 206 for scheduling the wireless communication of the various data flows that the base station 100 is currently receiving on its queues 200. Based on the scheduling performed by the scheduler 206, the controller 204 generates output data units according to the relevant communication protocol being used. For example, the controller 204 may generate output packets by adding a suitable header to the data to be communicated. The generated output data units are passed to a converter 202 that performs appropriate channel coding/modulation on those output data units so that they may be wirelessly transmitted/communicated to a subscriber station 104 via the antenna 106.

For the wireless communication of the various data flows to the subscriber stations 104, the base station 100 works on the basis of a sequence of time frames. In some embodiments, each time frame is a predetermined period of time, such as 5 ms. During each time frame in the sequence of time frames, the scheduler 206 performs a number of scheduling operations to determine which of the currently received data flows to wirelessly communicate during that time frame, as well as an order in which to wirelessly communicate these data flows. This will be described in more detail later.

Each of the data flows has an associated flow type. There is a plurality of possible flow types that the base station 100 may recognise and support, some of which are described below.

One of the possible flow types is UGS (Unsolicited Grant Service). A UGS data flow is to be communicated in real-time by periodically communicating data packets of a predetermined length. Examples of applications for UGS data flows include E1/T1 links (containing, for example, delay-sensitive speech signals) and VoIP communications (without silence suppression).

Another one of the possible flow types is rtPS (real-time Polling Service). An rtPS data flow is to be communicated in real-time by periodically communicating data packets of a variable length. Examples of applications for rtPS data flows include streaming video and VoIP communications (with silence suppression).

Another one of the possible flow types is nrtPS (non-real-time Polling Service). An nrtPS data flow is to be communicated with a minimum desired data rate as data packets of a variable length, the communication of the data being delay-tolerant. Examples of applications for nrtPS data flows include FTP communications.

Another one of the possible flow types is BE (Best Effort). A BE data flow is to be communicated provided there is sufficient bandwidth available for the wireless communication of that data flow during the current time frame.

Another one of the possible flow types is MNG (Management). An MNG data flow comprises management information relating to a wireless communication system being used for the wireless communication.

In this embodiment, the base station 100 is configured to support all of these different flow types, although it will be appreciated that the base station 100 could be configured to support more or fewer flow types depending on the particular application for the base station 100. Additionally, alternative flow types, such as ErtPS (Extended real-time Polling Service) in IEEE 802.16e, may be used, potentially in conjunction with the above-mentioned flow types.

Additionally, each of the data flows has one or more associated quality-of-service (QoS) parameters. The values for these QoS parameters may be dependent upon a variety of factors, such as: an amount of money that a user of a subscriber station 104 has paid; special service packages provided by the wireless communication service provider; etc. Some of the QoS parameters are described below; others are introduced and discussed later in the description. Additionally, data flows of different flow types may make use of different sets of QoS parameters.

One of the QoS parameters of a data flow is a value flowRmin, which represents a desired minimum amount of data which should normally be communicated in each time frame for that data flow. flowRmin may be measured in bytes per time frame, or any other appropriate amount of data per unit time. Data flows of the UGS, rtPS, nrtPS and MNG flow type have a flowRmin QoS parameter.

Another one of the QoS parameters of a data flow is a value flowRmax, which represents a desired maximum amount of data which should normally be communicated in each time frame for that data flow. flowRmax may be measured in bytes per time frame, or any other appropriate amount of data per unit time. Data flows of the rtPS, nrtPS and BE flow type have a flowRmax QoS parameter.

Thus, the flowRmin and flowRmax QoS parameters (either on their own or combined) define a desired range for the quantity of data which should normally be wirelessly communicated for the corresponding data flow during each time frame.

However, as will be described later, it is possible that, during a time frame, the base station 100 may not service a particular data flow, i.e. during that time frame, no data from that data flow is wirelessly communicated to the appropriate subscriber station 104.

Therefore, a data flow with a flowRmin QoS parameter may also have an associated flowRminCredit variable which indicates a minimum amount of data which the scheduler 206 should actually try to schedule for wireless communication during the next time frame for that data flow. In particular, should the scheduler 206 not schedule wireless communication for that data flow during the current time frame, then it may increase the value of the flowRminCredit variable to reflect that, during the next time frame, it should try to schedule wireless communication of a larger amount of data for that data flow. The aim is, then, to achieve, on average, a quality of service for that data flow specified by its flowRmin QoS parameter.

Furthermore, a data flow with a flowRmax QoS parameter may also have an associated flowRmaxCredit variable which indicates a maximum amount of data which the scheduler 206 should actually try to schedule for wireless communication during the next time frame for that data flow. In particular, should the scheduler 206 not schedule wireless communication for that data flow during the current time frame, then it may increase the value of the flowRmaxCredit variable to reflect that, during the next time frame, it could try to schedule wireless communication of a larger amount of data for that data flow. The aim is, then, to achieve, on average, a quality of service for that data flow specified by its flowRmax QoS parameter.

Whilst some of the QoS parameters for a data flow, such as flowRmin and flowRmax, are specified in terms of bytes per time frame (or other suitable quantities of data per unit time), the base station 100 operates by transmitting a number of symbols per time frame. The amount of data that a symbol represents (or can carry) depends on the coding/modulation scheme used for the wireless communication. Table 1 below provides details of the number of bytes that make up a single transmitted symbol for each of a number of well-known coding/modulation techniques.

TABLE 1

| Coding/modulation technique | Number of bytes per symbol transmitted using that coding/modulation technique |
| --- | --- |
| BPSK-12 | 12 |
| QPSK-12 | 24 |
| QPSK-34 | 36 |
| QAM-16-12 | 48 |
| QAM-16-34 | 72 |
| QAM-64-23 | 96 |
| QAM-64-34 | 108 |

For example, in relatively good communication conditions, QAM-64-34 modulation may be used for a data flow and each symbol communicated by the base station 100 then represents 108 bytes of data for that data flow. However, should the communication conditions worsen (for example, due to weather conditions, geographical conditions, etc.), then the modulation technique for that data flow may be changed to BPSK-12 modulation. If this happens, then each symbol communicated by the base station 100 represents 12 bytes of data for that data flow. If that data flow has a flow-Rmin QoS parameter of, say, 50 bytes per time frame, then, using QAM-64-34 modulation in the good communication conditions, the base station 100 only needs to allocate one symbol for this data flow in the current time frame, as that symbol can represent 108 bytes, which is more than enough to satisfy the flowRmin QoS parameter. However, should the modulation technique be changed to BPSK-12 modulation, then the base station 100 needs to allocate five symbols for this data flow in the current time frame, as this is the smallest number of symbols that can be transmitted using BPSK-12 modulation to satisfy the flowRmin QoS parameter.

Different data flows and symbols may make use of different coding/modulation schemes. Furthermore, as mentioned, the coding/modulation scheme used for a data flow may vary between time frames, for example to cater for changes in weather conditions or to cope with changes in the geographical location and environment of the relevant subscriber station 104. Changing the coding/modulation scheme may be performed by any suitable modulation/coding selection scheme.

In some embodiments, the scheduler 206 is implemented as a software component of the base station 100. In particular, this software component may consist of two distinct levels: a "list-level" and a "flow-level". These will be described in more detail below. However, as an overview, the list-level processing selects which data flows to service in a particular time frame, and the order in which to process them. Flow-level processing determines how to generate an output data unit for a particular data flow and updates the scheduling status of that data flow, as well as a record of the amount of bandwidth available for the wireless communication during that time frame. As will be apparent from the description below, this separation minimises the impact on the scheduler 206 and the amount of work involved when: adding a new flow type; removing an existing flow type; changing a priority order for the flow types; changing how the QoS parameters for the data flows should be satisfied; etc.

Figure 3:
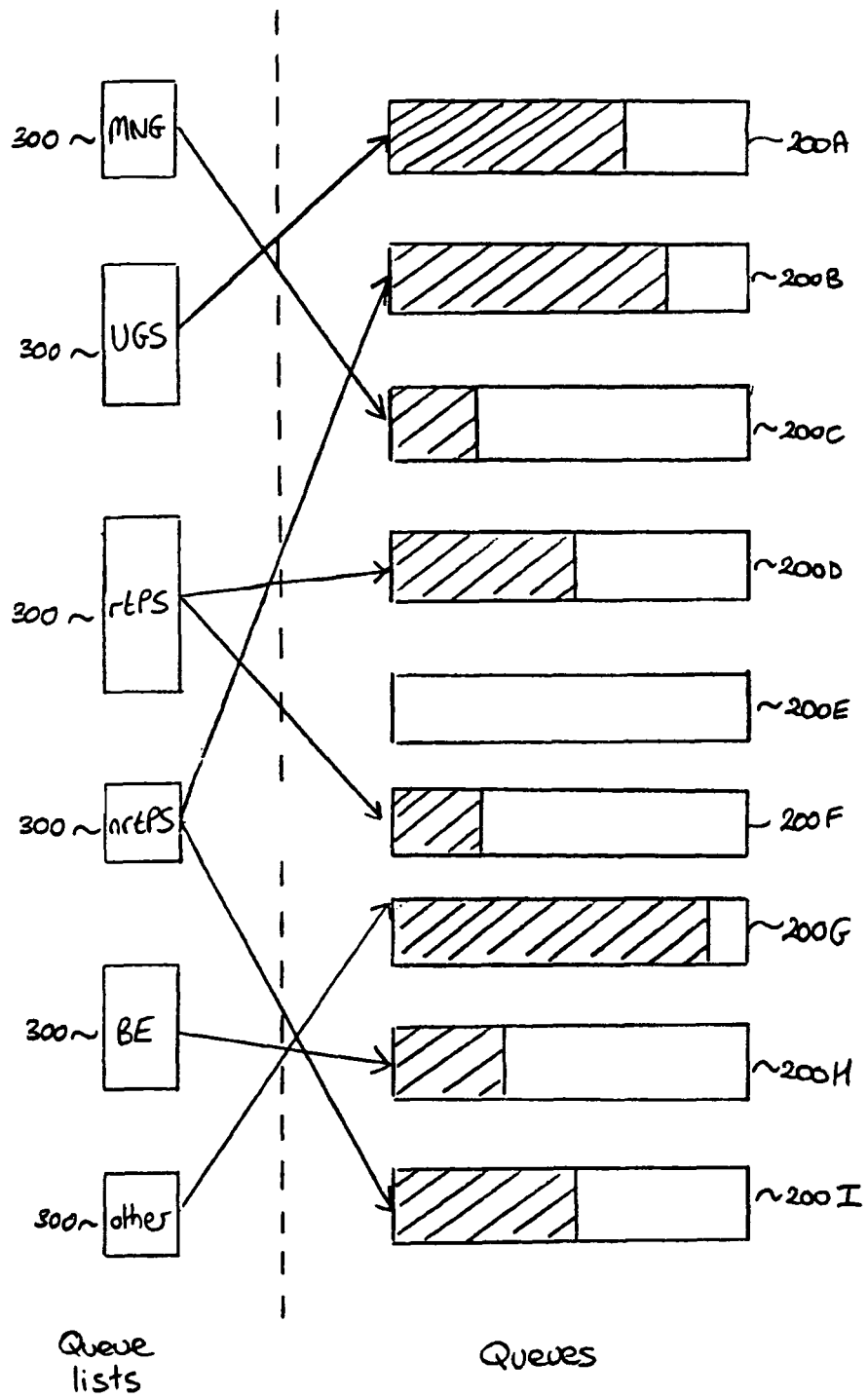
FIG. 3 schematically illustrates an overview of list-level processing performed by a scheduler according to an embodiment of the invention.

FIG. 3 schematically illustrates an overview of the list-level processing performed by the scheduler 206. In FIG. 3, the queues 200 of the base station 100 are illustrated as storing varying amounts of data (shown as shaded portions of the queues 200). Each of the data flows being received by the base station 100 uses a corresponding queue 200. During each of the time frames, the list-level component of the scheduler 206 maintains, for each of the possible flow types, a queue list 300 that identifies the queues 200 corresponding to data flows of that flow type. The queue lists 300 only identify queues 200 that are storing data for a data flow, i.e. an empty queue 200 is not identified in any of the queue lists 300. For example, in FIG. 3, the queue 200E is not storing any data for a data flow and hence none of the queue lists 300 identify that queue 200E.

In FIG. 3:

(a) There is one MNG data flow, data for which is being stored in the queue 200C, so that the MNG queue list 300 identifies the queue 200C.

(b) There is one UGS data flow, data for which is being stored in the queue 200A, so that the UGS queue list 300 identifies the queue 200A.

(c) There are two rtPS data flows. For one of them, data is being stored in the queue 200D; for the other, data is being stored in the queue 200F. Thus, the rtPS queue list 300 identifies the queues 200D and 200F.

(d) There are two nrtPS data flows. For one of them, data is being stored in the queue 200B; for the other, data is being stored in the queue 200I. Thus, the nrtPS queue list 300 identifies the queues 200B and 200I.

(e) There is one BE data flow, data for which is being stored in the queue 200H, so that the BE queue list 300 identifies the queue 200H.

(f) There is one "other" data flow. This type of data flow may be a data flow type that the operator of the base station 100 has established for their own purposes. Data for this data flow is being stored in the queue 200G, so that the "other" queue list 300 identifies the queue 200G.

During each time frame, the queue lists 300 are initialised or updated according to the activity within the queues 200. This may be performed at the beginning of a time frame. Alternatively, this may be performed at the end of a time frame, in preparation for the next time frame. For example, this may be performed at the beginning of a time frame when data is received by the base station 100, or at the end of a time frame when the scheduler 206 schedules the communication of data for a data flow.

As the base station 100 of this embodiment supports rtPS data flows, the scheduler 206 may make use of an rtPS priority queue list 300 (not illustrated), the purpose of which will be described later with reference to FIG. 4a. When initialising the queue lists 300 during a time frame, the rtPS priority queue list 300 is set to identify no queues 200.

Additionally, as the base station 100 of this embodiment supports nrtPS data flows, the scheduler 206 may make use of an nrtPS priority queue list (not illustrated), the purpose of which will be described later with reference to FIG. 4b. When initialising the queue lists 300 during a time frame, the nrtPS priority queue list 300 is set to identify no queues 200.

It will be appreciated that any suitable means may be used to identify a queue 200 within a queue list 300. For example, each of the queues 200 may have its own unique queue identification number (QID) and a queue list 300 may be a list of QIDs for the appropriate queues 200 to be identified in that queue list 300.

Figure 4:
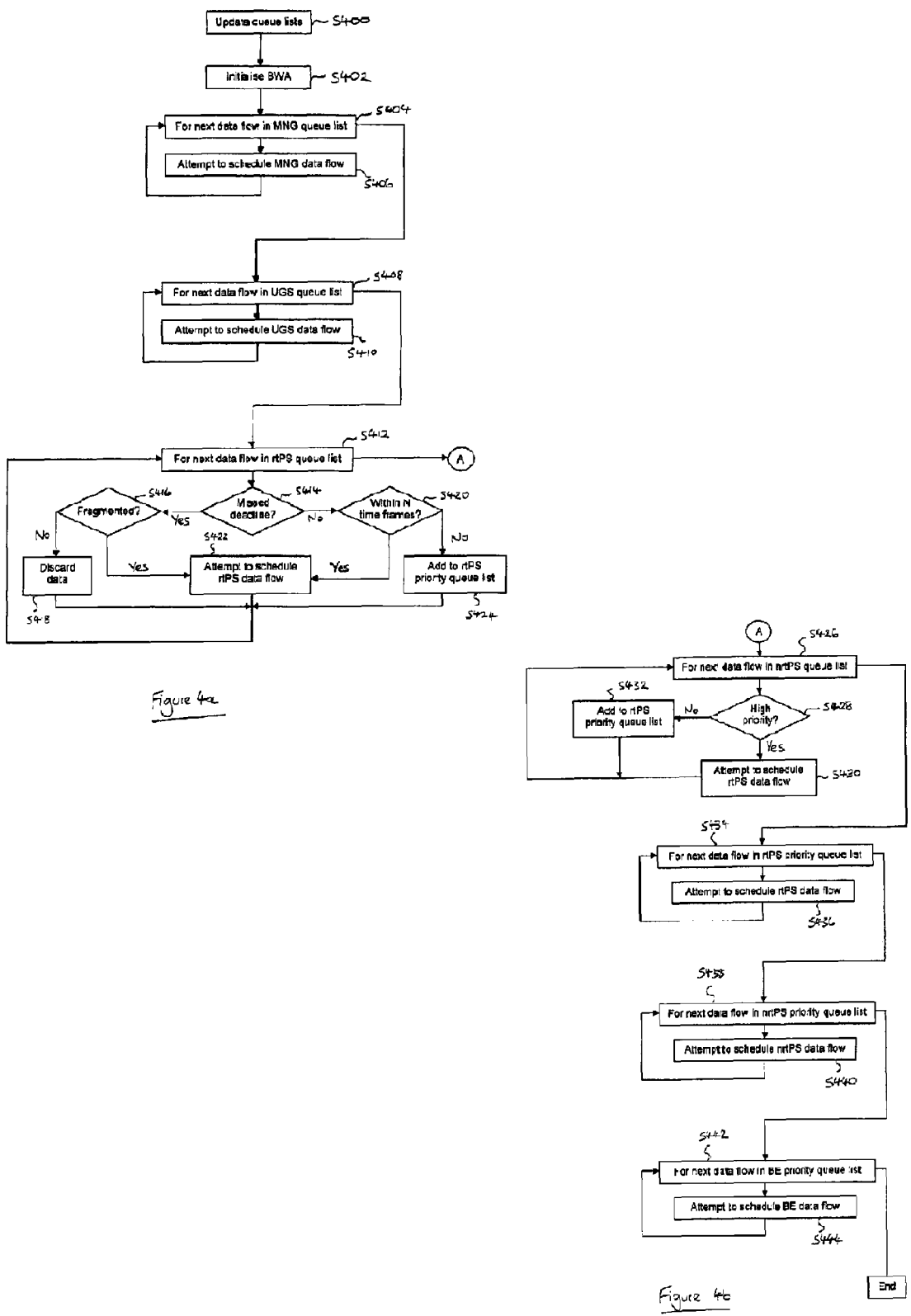
FIGS. 4a and 4b together are a flowchart of list-level processing performed by a list-level component of a scheduler according to an embodiment of the invention.

FIGS. 4a and 4b together are a flowchart of the list-level processing performed by the list-level component of the scheduler 206 during each time frame.

At a step S400, the scheduler 206 updates/re-initialises the queue lists 300. This is performed in the manner described above. However, as discussed, this step could be performed at the end of a time frame.

Next, at a step S402, the scheduler 206 initialises a variable BWA. The variable BWA is used to record the amount of bandwidth available for the wireless communication during the current time frame. As will be described later, the scheduler 206 updates BWA during a time frame in accordance with the scheduling that it performs. BWA is measured as a number symbols for the current frame. BWA may be initialised by a variety of means, such as by physical layer functions of the base station 100 that select which modulation methods may be used within the current time frame (which then implicitly determines how many symbols may be transmitted in the current time frame) in dependence upon such factors as weather conditions, geographical locations, etc. Accordingly, the initialised value of BWA may change from time frame to time frame.

As will be described in more detail, the scheduler 206 then processes the queue lists 300 in a predetermined order. Processing a queue list 300 comprises, for each queue 200 identified in that queue list 300, attempting to schedule the communication of data stored on that queue 200 during the current time frame in dependence upon (i) the one or more QoS parameters associated with the corresponding data flow and (ii) an amount of bandwidth available for the wireless communication during the current time frame.

When the base station 100 supports UGS, rtPS, nrtPS and BE data flows, then, as will be described in more detail below, some embodiments use a predetermined order for the queues lists 300 as follows: the queue list 300 for the UGS flow type is processed before the queue list 300 for the rtPS flow type; the queue list 300 for the rtPS flow type is processed before the queue list 300 for the nrtPS flow type; and the queue list 300 for the nrtPS flow type is processed before the queue list 300 for the BE flow type. If the base station 100 also supports MNG data flows, then, as will be described in more detail below, some embodiments use a predetermined order for the queues lists 300 in which the queue list 300 for the MNG flow type is processed before the queue list 300 for the UGS flow type. However, it will be appreciated that other predetermined orders could be used according to the flow types supported by the base station 100, together with the relative priorities that the operators of the wireless communication system places on the different flow types.

Thus, at a step S404, the scheduler 206 sequentially identifies each (if any) of the queues 200 in the MNG queue list 300. For each of the queues 200 in the MNG queue list 300, the scheduler 206, at a step S406, attempts to schedule the wireless communication of data for the data flow corresponding to that queue 200. This attempt to schedule is performed by a flow-level component of the scheduler 206 and will be described in more detail later.

Once the scheduler 206 has processed the queues 200 identified in the MNG queue list 300, then processing continues at a step S408. At the step S408, the scheduler 206 sequentially identifies each (if any) of the queues 200 in the UGS queue list 300. For each of the queues 200 in the UGS queue list 300, the scheduler 206, at a step S410, attempts to schedule the wireless communication of data for the data flow corresponding to that queue 200. This attempt to schedule is performed by a flow-level component of the scheduler 206 and will be described in more detail later.

Once the scheduler 206 has processed the queues 200 identified in the UGS queue list 300, then processing continues at a step S412. At the step S412, the scheduler 206 sequentially identifies each (if any) of the queues 200 in the rtPS queue list 300. For each of the queues 200 in the rtPS queue list 300, the scheduler 206 performs processing as described below. However, in overview, prior to attempting to schedule the communication of data stored on an rtPS queue 200, the scheduler 206 determines whether or not to make an attempt to schedule the communication of data stored on that queue 200. If the scheduler 206 determines that an attempt to schedule the communication of data stored on that queue 200 should be made, then the scheduler 206 will attempt to schedule the communication of data stored on that queue 200.

In particular, at a step S414, the scheduler 206 determines whether a deadline for communicating a data packet of the corresponding rtPS data flow has been missed. As will be appreciated, the real-time nature of rtPS data flows dictates that packets of data must be communicated by a certain deadline in order for the communication to actually be in real-time. The method by which the scheduler 206 determines whether a data packet of an rtPS data flow has missed a deadline is described in more detail later.

If, at the step S414, the scheduler 206 determines that a data packet to be communicated has missed a communication deadline, then processing continues at a step S416; otherwise processing continues at a step S420.

At the step S416, the scheduler 206 determines whether the data packet that has missed a communication deadline is fragmented, i.e. whether a part of that data packet has already been communicated in a preceding time frame. If the data packet is not fragmented, then there is no need to communicate the data of that data packet, since its deadline has been missed and none of its data has been communicated yet. Therefore, if the data packet is not fragmented then processing continues at the step S418, at which the scheduler 206 discards the data stored in the queue 200. In other words, the scheduler discards data stored on the queue 200 corresponding to the rtPS data flow if the deadline has been missed and the queue 200 does not store data belonging to a data packet part of which has already been communicated.

However, if the data packet is fragmented, then in order to ensure the destination subscriber station 106 receives a complete data packet, processing continues at a step S422 at which the scheduler 206 attempts to schedule the communication of data stored on the queue 200. This attempt to schedule is performed by a flow-level component of the scheduler 206 and will be described in more detail later. In other words, if the deadline has been missed and the queue 200 corresponding to the rtPS data flow stores data belonging to a data packet part of which has already been communicated, then the scheduler 206 determines that an attempt should be made to schedule the communication of data stored on the queue 200 corresponding to that rtPS data flow.

For the situation when the data packet has not missed a communication deadline, the scheduler 206, at the step S420, determines whether the deadline is at most a predetermined number N of time frames from the current time frame. If the deadline is at most this predetermined number N of time frames from the current time frame, then the scheduler 206 determines that an attempt should be made to schedule the communication of data stored on the queue 200 corresponding to the rtPS data flow. Processing then continues at the step S422.

However, if the scheduler 206 determines at the step S420 that the deadline is more than the predetermined number N of time frames from the current time frame, then the scheduler 206, at a step S424, adds an identification of the queue 200 corresponding to the rtPS data flow to the rtPS priority queue list 300. Note that the rtPS priority queue list 300 will be processed after the rtPS queue list 300 has been processed.

The predetermined number N of time frames may be any non-negative integer. However, in some embodiments, the predetermined number N of time frames is either 0 or 1. Additionally, the predetermined number N of time frames may be one of the QoS parameters associated with the rtPS data flow. In this case, the predetermined number N of time frames may vary between different rtPS data flows. The larger the value of the predetermined number N of time frames, the more likely it will be that the scheduler 206 will successfully schedule the communication of the data for that rtPS data flow during a time frame.

Once the scheduler 206 has processed the queues 200 identified in the rtPS queue list 300, then processing continues at a step S426. At the step S426, the scheduler 206 sequentially identifies each (if any) of the queues 200 in the nrtPS queue list 300. For each of the queues 200 in the nrtPS queue list 300, the scheduler 206 performs processing as described below. However, in overview, prior to attempting to schedule the communication of data stored on an nrtPS queue 200, the scheduler 206 determines whether or not to make an attempt to schedule the communication of data stored on that queue 200. If the scheduler 206 determines that an attempt to schedule the communication of data stored on that queue 200 should be made, then the scheduler 206 will attempt to schedule the communication of data stored on that queue 200.

In particular, at a step S428, the scheduler 206 determines whether a priority value for the data flow corresponding to the nrtPS queue 200 is sufficiently high. To this end, each nrtPS data flow may have a QoS parameter indicating a priority value for that data flow. Additionally, the scheduler 206 may use a threshold priority value such that a data flow is considered to have a sufficiently high priority if its priority value is above this threshold priority value.

If, at the step S428, the scheduler 206 determines that the priority value is sufficiently high, then processing continues at a step S430 at which the scheduler 206 attempts to schedule the communication of data stored on the queue 200 corresponding to the nrtPS data flow. This attempt to schedule is performed by a flow-level component of the scheduler 206 and will be described in more detail later.

However, if, at the step S428, the scheduler 206 determines that the priority value is not sufficiently high, then processing continues at a step S432 at which the scheduler 206 adds an identification of the queue 200 corresponding to the nrtPS data flow to the nrtPS priority queue list 300. Note that the nrtPS priority queue list 300 will be processed after the nrtPS queue list 300 has been processed.

Once the scheduler 206 has processed the queues 200 identified in the nrtPS queue list 300, then processing continues at a step S434. At the step S434, the scheduler 206 sequentially identifies each (if any) of the queues 200 in the rtPS priority queue list 300. For each of the queues 200 in the rtPS priority queue list 300, the scheduler 206, at a step S436, attempts to schedule the wireless communication of data of the data flow corresponding to that queue 200. This attempt to schedule is performed by a flow-level component of the scheduler 206 and will be described in more detail later.

Once the scheduler 206 has processed the queues 200 identified in the rtPS priority queue list 300, then processing continues at a step S438. At the step S438, the scheduler 206 sequentially identifies each (if any) of the queues 200 in the nrtPS priority queue list 300. For each of the queues 200 in the nrtPS priority queue list 300, the scheduler 206, at a step S440, attempts to schedule the wireless communication of data of the data flow corresponding to that queue 200. This attempt to schedule is performed by a flow-level component of the scheduler 206 and will be described in more detail later.

Once the scheduler 206 has processed the queues 200 identified in the nrtPS priority queue list 300, then processing continues at a step S442. At the step S442, the scheduler 206 sequentially identifies each (if any) of the queues 200 in the BE queue list 300. For each of the queues 200 in the BE queue list 300, the scheduler 206, at a step S444, attempts to schedule the wireless communication of data of the data flow corresponding to that queue 200. This attempt to schedule is performed by a flow-level component of the scheduler 206 and will be described in more detail later.

Figure 5:
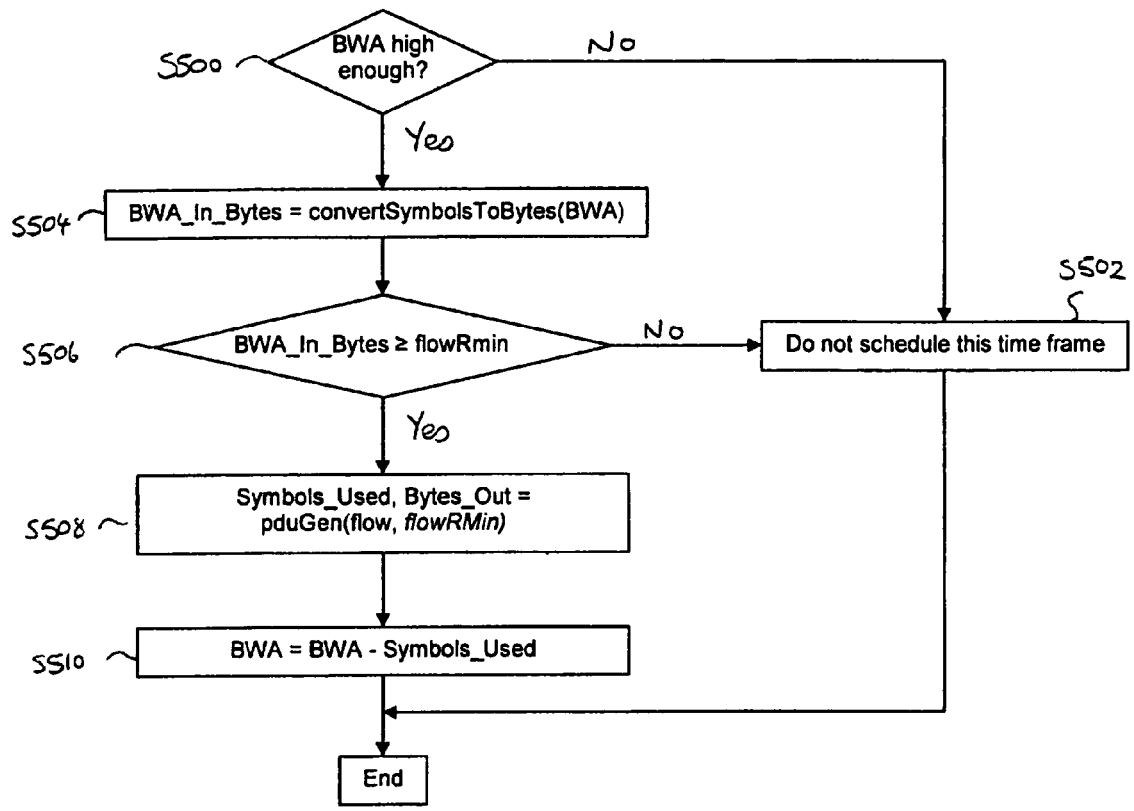
FIGS. 5, 6 and 7 are flowcharts illustrating the processing performed by flow-level components of a scheduler according to an embodiment of the invention.

FIG. 5 is a flowchart illustrating the processing performed by a flow-level component of the scheduler 206 when attempting to schedule the wireless communication of data for an MNG or UGS data flow. This is the processing performed at the steps S406 and S410 of FIG. 4a.

Processing begins at a step S500 at which the scheduler 206 determines whether the value of BWA is sufficiently high enough to be useful. This may be performed by simply checking whether the value of BWA is above a predetermined threshold, such as 1 or 2 symbols.

If the value of BWA is not sufficiently high, then the scheduler 206 continues processing at a step S502 at which it does not schedule the communication of data for the current data flow during the current time frame. Additionally, the scheduler clears the queue 200 for this data flow, i.e. the data currently in the queue 200 for this data flow is discarded. Processing then ends for this data flow.

However, if the value of BWA is sufficiently high, then the scheduler 206 continues processing at a step S504 at which the amount of bandwidth available, as measured in bytes, is determined. As described above, BWA is measured as a number of symbols available in the current time frame, whilst the number of bytes per symbol may vary depending on the modulation/coding technique being used for the wireless communication. Therefore, the scheduler 206 makes use of a function convertSymbolsToBytes that takes in BWA as an input parameter and returns the number of bytes that may be represented by all of the symbols that remain available during the current time frame combined. The number of bytes returned by convertSymbolsToBytes is stored in a varibale BWA_In_Bytes.

In order to arrive at this number of bytes, the function convertSymbolsToBytes uses the conversion factors given in Table 1 above. For example, if BWA is currently 7 symbols and the modulation/coding technique to be used for the first 3 of those symbols is QPSK-34 (so that each of these 3 symbols can represent 36 bytes) and the modulation/coding technique to be used for the last 4 of those symbols is QAM-64-23 (so that each of these 4 symbols can represent 96 bytes), then the available bandwidth for this data flow during the current time frame, BWA_In_Bytes, is 3×36+4×96=492 bytes.

At a step S506, the scheduler 206 determines whether, given the flowRmin QoS parameter for the data flow, there is sufficient bandwidth available to satisfy this flowRmin QoS parameter. In particular, at the step S506, the scheduler 206 compares BWA_In_Bytes with flowRmin. If, at the step S506, it is determined that BWA_In_Bytes is less than flowRmin (so that the flowRmin QoS parameter could not be satisfied during this time frame), then processing continues at the step S502; otherwise processing continues at a step S508.

At the step S508, the scheduler 206 calls a function pduGen. The function pduGen has two input parameters: the first identifies the data flow for which an output data unit is to be generated; the second specifies an upper bound on the size of the output data unit generated. If this upper bound can be achieved, then the function pduGen generates an output data unit for the specified data flow with that upper bound size. However, if there is not sufficient data in the relevant queue 200 to generate an output data unit of the upper bound size, then the output data unit generated is smaller than this upper bound. The generated output data unit is then wirelessly communicated by the base station 100. On completion, the function pduGen sets two variables, Symbols_Used and Bytes_Out to be, respectively, the number of symbols required for communicating the generated output data unit and the number of bytes that actually make up that output data unit.

At the step S508, the scheduler 206 calls the function pduGen identifying the current data flow and specifying flowRmin bytes as the upper bound for the size of the output data unit to be generated. An output data unit of flowRmin bytes could be communicated as it has already been determined, at the step S506, that there is sufficient bandwidth available to communicate an output data unit of this size.

Finally, at a step S510, the scheduler 206 updates BWA by subtracting from it Symbols_Used. This reflects the fact that, in communicating the output data unit, the number of symbols required is Symbols_Used, so that the number of symbols available for other data flows has been reduced by this amount of symbols.

Figure 6:
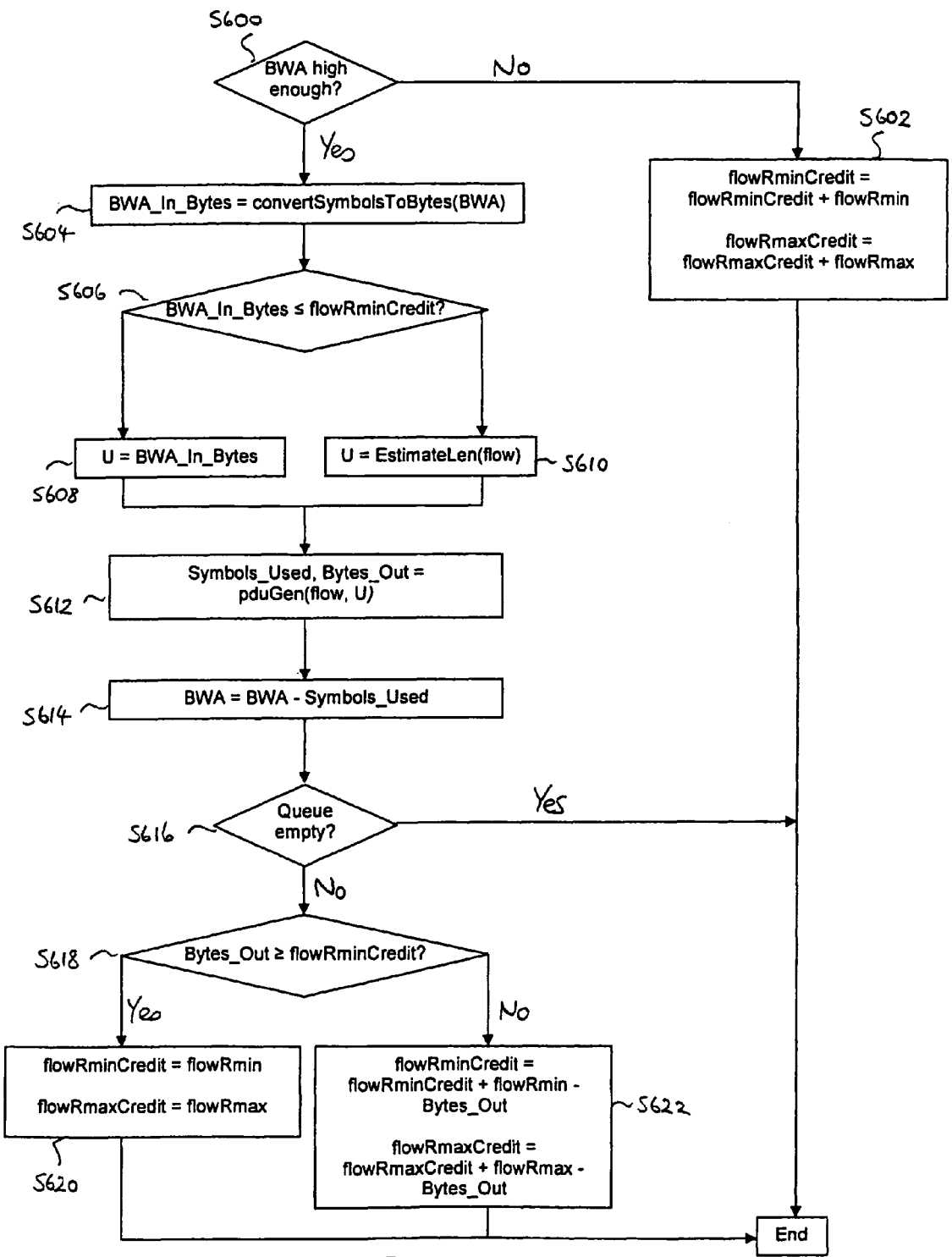

FIG. 6 is a flowchart illustrating the processing performed by a flow-level component of the scheduler 206 when attempting to schedule the wireless communication of data for an rtPS or nrtPS data flow. This is the processing performed at the step S422 of FIG. 4a and the steps S430, S436 and S440 of FIG. 4b.

Processing begins at a step S600 at which the scheduler 206 determines whether the value of BWA is sufficiently high enough to be useful. This is similar to the processing performed at the step S500 of FIG. 5.

If the value of BWA is not sufficiently high, then the scheduler 206 continues processing at a step S602 at which it does not schedule the communication of data for the current data flow during the current time frame. Instead, the scheduler 206 increments the variables flowRminCredit and flowRmaxCredit of the data flow by flowRmin and flowRmax respectively. Processing then ends for this data flow.

However, if the value of BWA is sufficiently high, then the scheduler 206 continues processing at a step S604 at which the amount of bandwidth available, as measured in bytes, is determined. This is similar to the processing performed at the step S504 of FIG. 5.

At a step S606, the scheduler 206 determines whether, given the variable flowRminCredit for the data flow, there is sufficient bandwidth available to satisfy the flowRmin QoS parameter for the data flow—the objective here being to communicate flowRminCredit bytes for the data flow. In particular, at the step S606, the scheduler 206 compares BWA_In_Bytes with flowRminCredit. If, at the step S606, it is determined that BWA_In_Bytes is at most flowRminCredit, then processing continues at a step S608; otherwise, processing continues at a step S610.

At the step S608, the scheduler 206 sets an upper bound U for the generation of an output data unit for the current data flow. The upper bound U is set to be BWA_In_Bytes, as this is the largest amount of data that can be communicated during the remainder of the current time frame and is the closest possible to actually communicating the desired flowRminCredit bytes of data.

At the step S610, the scheduler 206 calls a function EstimateLen which determines the length U of an output data unit for the current data flow when trying to communicate up to flowRminCredit bytes for the current data flow.

At the step S612, the scheduler 206 calls the function pduGen, specifying the current data flow and the upper bound U determined at the step S608 or S610 as appropriate. As happens at the step S508 of FIG. 5, the values of Symbols_Used and Bytes_Out are set by calling the function pduGen.

At the step S614, the scheduler 206 updates BWA by subtracting from it Symbols_Used. This is similar to the processing performed at the step S510 of FIG. 5.

At the step S616, the scheduler 206 determines whether the queue 200 for this data flow is now empty, i.e. whether all of the data that was in the queue 200 has now been communicated within the generated output data unit. If the queue 200 is now empty, then processing has been completed for this data flow; otherwise, processing continues at a step S618.

At the step S618, the scheduler 206 determines whether the number of bytes output in the output data unit achieved the target of outputting at least flowRminCredit bytes. In particular, the scheduler 206 compares Bytes_Out with flowRminCredit. If Bytes_Out is at least flowRminCredit, then, at a step S620, the scheduler 206 re-sets the variables flowRminCredit and flowRmaxCredit to be flowRmin and flowRmax respectively. If, however, Bytes_Out is less than flowRminCredit, then, at a step S622, the scheduler 206 adjusts the variables flowRminCredit and flowRmaxCredit by (flowRmin-Bytes_Out) and (flowRmax-Bytes_Out) respectively, to reflect how much data was actually output.

Figure 7:
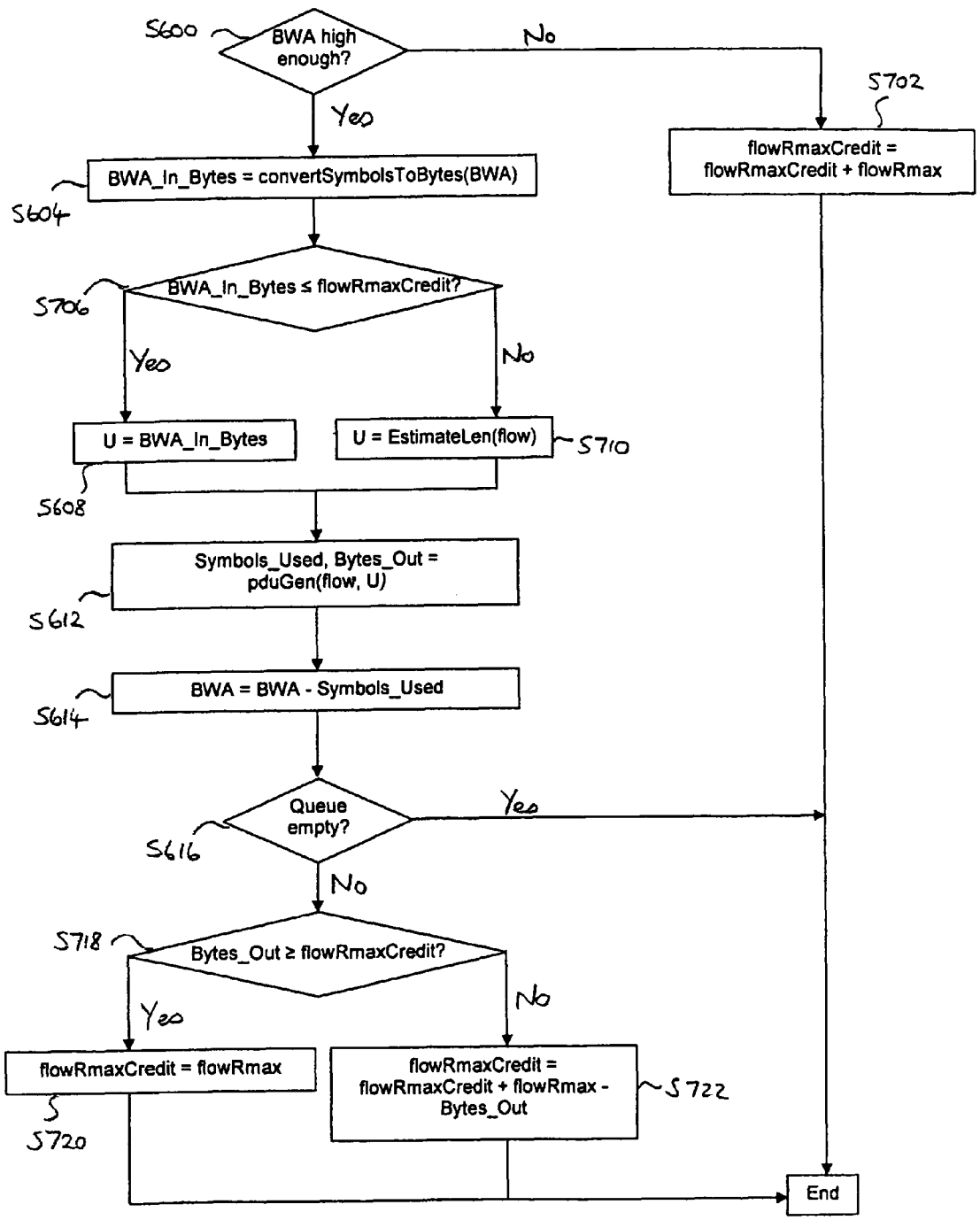

FIG. 7 is a flowchart illustrating the processing performed by a flow-level component of the scheduler 206 when attempting to schedule the wireless communication of data for an BE data flow. This is the processing performed at the step S444 of FIG. 4b.

The flow-level processing performed for BE data flows is very similar to that for rtPS and nrtPS data flows. Therefore, the flowchart of FIG. 7 is similar to that of FIG. 6. However, as BE data flows do not have a flowRmin QoS parameter, the processing for the BE data flows is subtly different to that for rtPS and nrtPS data flows. In particular, the flow chart of FIG. 7 is the same as that of FIG. 6, except that the steps S602, S606, S610, S618, S620 and S622 have been replaced in FIG. 7 by their counterparts that take into account this lack of flowRmin QoS parameter, namely steps S702, S706, S710, S718, S720 and S722. In detail:
  the steps S702, S720 and S722 are the same as the steps S602, S620 and S622 respectively, except that no update of a flowRminCredit variable is performed for the BE data flow;
  the steps S706 and S718 are the same as the steps S606 and S618 respectively, except that a comparison is made with flowRmaxCredit instead of flowRminCredit (the aim when communicating BE data flows is to try to communicate flowRmaxCredit bytes of data each time frame); and
  at the step S710, the function EstimateLen estimates the length of an output data unit based on trying to output at least flowRmaxCredit bytes of data.

As mentioned when describing FIG. 4a, the list-level component of the scheduler 206 determines whether a communication deadline has been missed for a data packet of an rtPS data flow. This is described below with reference to the follow values:
  arrTime—an index number, in the sequence of time frames, of the time frame during which the data packet was initially stored in the relevant data queue 200 corresponding to the rtPS data flow;

latency—a number of time frames that the communication of the data packet may be delayed (this could be one of the QoS parameters for the rtPS data flow);

curTime—an index number, in the sequence of time frames, of the current time frame;

deadline—an index number, in the sequence of time frames, of the last time frame at which communication of the data packet should begin (be it over one or multiple time frames); and pktLen—the length of the data packet.

To calculate deadline, the following formula may be used:

deadline=arrTime+latency−[pktLen/flowRmin]

As the length of data packets (pktLen) may vary within an rtPS data flow and the flowRmin QoS parameter may vary between rtPS data flows, calculating deadline values using the above formula traditionally involves performing many division operations each time frame. Division operations are usually a very expensive operation in terms of processor time/clock-cycles. Therefore, some embodiments do not explicitly calculate the value of deadline for a particular data flow.

Instead, these embodiments make use of the following relationship: the deadline is n time frames away from the current time frame if:

(arrTime+latency−curTime)·flowRmin∈[pktLen+ n·flowRmin,pktLen+(n+1)·flowRmin)

The Lemma and Theorem at the end of the description provide details to support this relationship.

The deadline is within the predetermined number N time frames of the current time frame if 0≦n≦N. This may be tested by determining the range [pktLen, pktLen+(N+1) ·flowR min) and checking whether the value (arrTime+latency−curTime)·flowRmin lies in that range. If this value lies above this range, then the deadline is more than N time frames away; if this value lies below this range, then the deadline has been missed.

Therefore, the scheduler 206, at the step 414 of FIG. 4*a*, may calculate the range [pktLen, pktLen+(N+1)·flowRmin) and determine that the deadline has been missed if (arrTime+latency−curTime)·flowRmin lies below this range.

Additionally, the scheduler 206, at the step 420 of FIG. 4*a*, may determine that the deadline is within the predetermined number N time frames from the current time frame if (arrTime+latency−curTime)·flowRmin lies within this calculated range.

Using this method, the scheduler 206 does not have to perform any costly division operations to determine (i) whether a deadline has been missed or (ii) whether the deadline is within N time frames from the current time frame. This reduces the amount of processing time required for the scheduler 206.

As an example, suppose that arrTime=3, latency=4 time frames, pktLen=11 bytes, flowRmin=4 bytes per time frame and N=0. Then the range to be calculated by the scheduler 206 for this data flow is [11, 15). Table 2 below shows the situation for various values of curTime:

TABLE 2

| curTime | (arrTime + latency − curTime) · flowR min | Comment |
|---|---|---|
| 3 | 16 | Deadline above range, so more than N time frames away, so decision at the step S420 is to proceed to the step S424 |

TABLE 2-continued

| curTime | (arrTime + latency − curTime) · flowR min | Comment |
|---|---|---|
| 4 | 12 | Deadline within range, so decision at the step S420 is to proceed to the step S422 |
| 5 | 8 | Deadline has been missed |
| 6 | 4 | Deadline has been missed |

It will be appreciated that this method of calculating whether a deadline has been missed, or whether the deadline is within a predetermined number N of time frames from a current time frame, is applicable to other types of data flow, not just rtPS data flows.

It will be appreciated that, insofar as embodiments of the invention are implemented, at least in part, by a computer program, then a data carrying medium, such as a storage medium and a transmission medium, carrying that computer program are envisaged as aspects of the invention.

It will also be appreciated that the scheduler 206 may be used in other wireless communication scenarios and need not be restricted to the system shown in FIG. 1. For example, a subscriber station 104 may wirelessly communicate directly with one or more other data recipients (such as other subscriber stations 104) and may therefore make use of the scheduler 206 for such wireless communication.

As will be apparent from the above description, structuring the scheduler 206 to use list-level components and flow-level components reduces the impact on the scheduler 206 and the amount of work involved when: adding a new flow type; removing an existing flow type; changing a priority order for the flow types; changing how the QoS parameters for the data flows should be satisfied; etc. Additionally, using the above-described deadline-determination method that does not require division operations means that the scheduler 206 does not have to perform any costly division operations to determine (i) whether a deadline has been missed or (ii) whether the deadline is within N time frames from the current time frame. This reduces the amount of processing time required for the scheduler 206.

Lemma: For positive integers a, b and c, $$\lceil \frac{a}{b} \rceil = c \Leftrightarrow b \cdot c \in [a, a+b), \text{ i.e. } a \leq b \cdot c < a+b.$$

Proof:

$$(\Rightarrow) \lceil \frac{a}{b} \rceil = \frac{a}{b} + \varepsilon \text{ where } 0 \leq \varepsilon < 1.$$

Therefore, $$b \cdot c = b \cdot \left(\frac{a}{b} + \varepsilon\right) = a + \varepsilon \cdot b \in [a, a+b)$$

($\Leftarrow$) If b·c∈[a,a+b), then b·c=a+ε·b, where 0≦ε<1. Therefore $$c = \frac{a}{b} + \varepsilon \text{ where } \frac{a}{b} + \varepsilon$$

is a positive integer.

If a is divisible by b, then $\epsilon=0$ is the only choice, and therefore $$c = \frac{a}{b} = \left\lceil \frac{a}{b} \right\rceil.$$

If a is not divisible by b, then $\epsilon \neq 0$ since $$\frac{a}{b} + \varepsilon$$

is a positive integer.
Therefore $$\frac{a}{b} + \varepsilon = \left\lfloor \frac{a}{b} \right\rfloor + r + \varepsilon,$$

where, r is the fractional part of a/b, and $r+\epsilon=1$.
Therefore $$\frac{a}{b} + \varepsilon = \left\lfloor \frac{a}{b} \right\rfloor + r + \varepsilon = \left\lfloor \frac{a}{b} \right\rfloor + 1 = \left\lceil \frac{a}{b} \right\rceil.$$

Theorem: Given the above-mentioned definitions of arrTime, curTime, latency, deadline, pktLen and flowRmin, if (arrTime+latency−curTime)·Rmin∈[paktLen+n·Rmin, paktLen+(n+1)·Rmin)

then at the current time frame indicated by curTime, the data packet in question is n time frame(s) away from the communication deadline. In particular, if n=0, then the deadline if the current time frame; if n<0, then the current time frame is past the deadline; and if n=1, then the current time frame is just before the deadline.
Proof:

$$\text{deadline} = arrTime + \text{latency} - \left\lceil \frac{pktLen}{flowR\ \min} \right\rceil$$

n frames to the deadline means curTime+n=deadline.
Therefore $$curTime + n = arrTime + \text{latency} - \left\lceil \frac{pktLen}{flowR\ \min} \right\rceil$$

Therefore $$\left\lceil \frac{pktLen}{flowR\ \min} \right\rceil = arrTime + \text{latency} - curTime - n$$

By applying the lemma, we have (arrTime+latency−curTime−n)·flowRmin∈[pktLen, pktLen+flowRmin)

Therefore (arrTime+latency−curTime)·flowRmin∈[pktLen+ n·flowRmin,pktLen+(n+1)·flowRmin)

The invention claimed is:

1. A method of scheduling wireless communication for one or more data flows, wherein, for each data flow, there is a corresponding queue to store data of that data flow, one or more quality-of-service parameters associated with that data flow, and a flow type associated with that data flow, there being a plurality of possible flow types, the method comprises:
    maintaining a record of the amount of bandwidth available for the wireless communication during the current time frame;
    maintaining, for each of the plurality of possible flow types, a queue list that identifies the queues corresponding to data flows of that flow type; and
    processing the queue lists in a predetermined order based on the quality of service parameters associated with the corresponding data flow, in which processing a queue list comprises, for each queue identified in that queue list:
        in response to determining the flow type associated with the queue is of a first type, attempting to schedule the communication of data stored at the queue for a current time frame based on one or more quality of service parameters and based on an amount of bandwidth available for wireless communication during the current time frame; and
        in response to determining the flow type associated with the queue is of a second type, attempting to schedule the communication of data stored at the queue for the current time frame based on whether a deadline to communicate the data has been missed and based on an amount of credits assigned to the data flow, the credits comprising a first credit based upon a minimum amount of data for the data flow and a second credit based upon a maximum amount of data for the data flow.

2. A method according to claim 1, wherein the first type is UGS, in which a UGS data flow is to be communicated in real-time by periodically communicating data packets of a predetermined length.

3. A method according to claim 1, wherein the second type is rtPS, in which an rtPS data flow is to be communicated in real-time by periodically communicating data packets of a variable length.

4. A method according to claim 1 wherein the second type is nrtPS, in which an nrtPS data flow is to be communicated with a minimum desired data rate as data packets of a variable length, the communication of the data being delay-tolerant.

5. A method according to claim 1, wherein the first type is BE, in which a BE data flow is to be communicated provided there is sufficient bandwidth available for the wireless communication of that data flow during the current time frame.

6. A method according to claim 2, wherein the predetermined order for the queues lists is
    the queue list for the UGS flow type is processed before the queue list for the rtPS flow type;
    the queue list for an rtPS flow type is processed before the queue list for the nrtPS flow type; and
    the queue list for an nrtPS flow type is processed before the queue list for the BE flow type.

7. A method according to claim 1, wherein the first type is MNG, in which an MNG data flow comprises management information relating to a wireless communication system being used for the wireless communication.

8. A method according to claim 1, wherein attempting to schedule comprises:

prior to attempting to schedule the communication of data stored on that queue, determining whether or not to make an attempt to schedule the communication of data stored on that queue; and if it is determined that an attempt to schedule the communication of data stored on that queue should be made, attempting to schedule the communication of data stored on that queue based on the amount of bandwidth available for wireless communication during the current time frame.

9. A method according to claim 8 wherein the second type is rtPS, in which an rtPS data flow is to be communicated in real-time by periodically communicating data packets of a variable length, and wherein determining whether or not make an attempt to schedule the communication of data stored on a queue corresponding to an rtPS data flow comprises determining whether a deadline for the communication of a data packet of that rtPS data flow has been missed.

10. A method according to claim 9, wherein if the deadline has not been missed and the deadline is at most a predetermined number of time frames from the current time frame, then it is determined that an attempt should be made to schedule the communication of data stored on the queue corresponding to that rtPS data flow based on the amount of bandwidth available for communication during the current time frame.

11. A method according to claim 9, comprising:
if the deadline has not been missed and the deadline is more than a predetermined number of time frames from the current time frame, adding an identification of the queue corresponding to that rtPS data flow to a queue list which, in the predetermined order for the queue lists, is processed after the queue list for the rtPS flow type.

12. A method according to claim 9, wherein if the deadline has been missed and the queue corresponding to that rtPS data flow stores data belonging to a data packet part of which has already been communicated, then it is determined that an attempt should be made to schedule the communication of data stored on the queue corresponding to that rtPS data flow.

13. A method according to claim 12, comprising:
discarding data stored on the queue corresponding to that rtPS data flow if the deadline has been missed and the queue corresponding to that rtPS data flow does not store data belonging to a data packet part of which has already been communicated.

14. A method according to claim 1 in which maintaining the record of the amount of bandwidth available comprises:
prior to processing the queue lists, initialising the record of the amount of bandwidth available; and
updating the record of the amount of bandwidth available in accordance with an attempt to schedule the wireless communication of data stored on a queue.

15. A method according to claim 14 in which one of the quality-of-service parameters associated with one of the data flows is an indication, flowRmax, of a desired maximum amount of data to be communicated during each time frame for that data flow.

16. The method of claim 1, further comprising adjusting the amount of credits based on the amount of data communicated for the current time frame.

17. The method of claim 1, further comprising resetting the first credit to the minimum amount of data for the data flow if the amount of data communicated over the data flow during the current time frame exceeds the first credit.

18. The method of claim 17, further comprising resetting the second credit to the maximum amount of data for the data flow if the amount of data communicated over the data flow during the current time frame exceeds the first credit.

19. The method of claim 18, wherein the resetting the second credit comprises resetting the second credit to the maximum amount of data for the data flow when the amount of data communicated over the data flow during the current time frame exceeds the first credit but is less than the second credit.

20. A non-transitory computer-readable medium carrying a computer program which, when executed by a computer, carries out a method comprising:
maintaining a record of the amount of bandwidth available for the wireless communication during the current time frame;
maintaining, for each of the plurality of possible flow types, a queue list that identifies the queues corresponding to data flows of that flow type; and
processing the queue lists in a predetermined order based on quality of service parameters associated with the corresponding data flow, in which processing a queue list comprises:
in response to determining the flow type associated with the queue is of a first type, attempting to schedule the communication of data stored at the queue for a current time frame based on one or more quality of service parameters and based on an amount of bandwidth available for wireless communication during the current time frame; and
in response to determining the flow type associated with the queue is of a second type, attempting to schedule the communication of data stored at the queue for the current time frame based on whether a deadline to communicate the data has been missed and based on an amount of credits assigned to the data flow, the credits based upon a minimum amount of data for the data flow, wherein the scheduling comprises:
scheduling for the data flow the communication of a largest amount of data that can be communicated over the bandwidth available for the wireless communication during the current time frame if the amount of bandwidth available for the wireless communication during the current time frame does not exceed the amount of credits assigned to the data flow; and
resetting the credits assigned to the data flow to the minimum amount of data for the data flow if the amount of data communicated over the data flow during the current time frame exceeds the amount of credits assigned to the data flow.

* * * * *